Patented Mar. 18, 1941

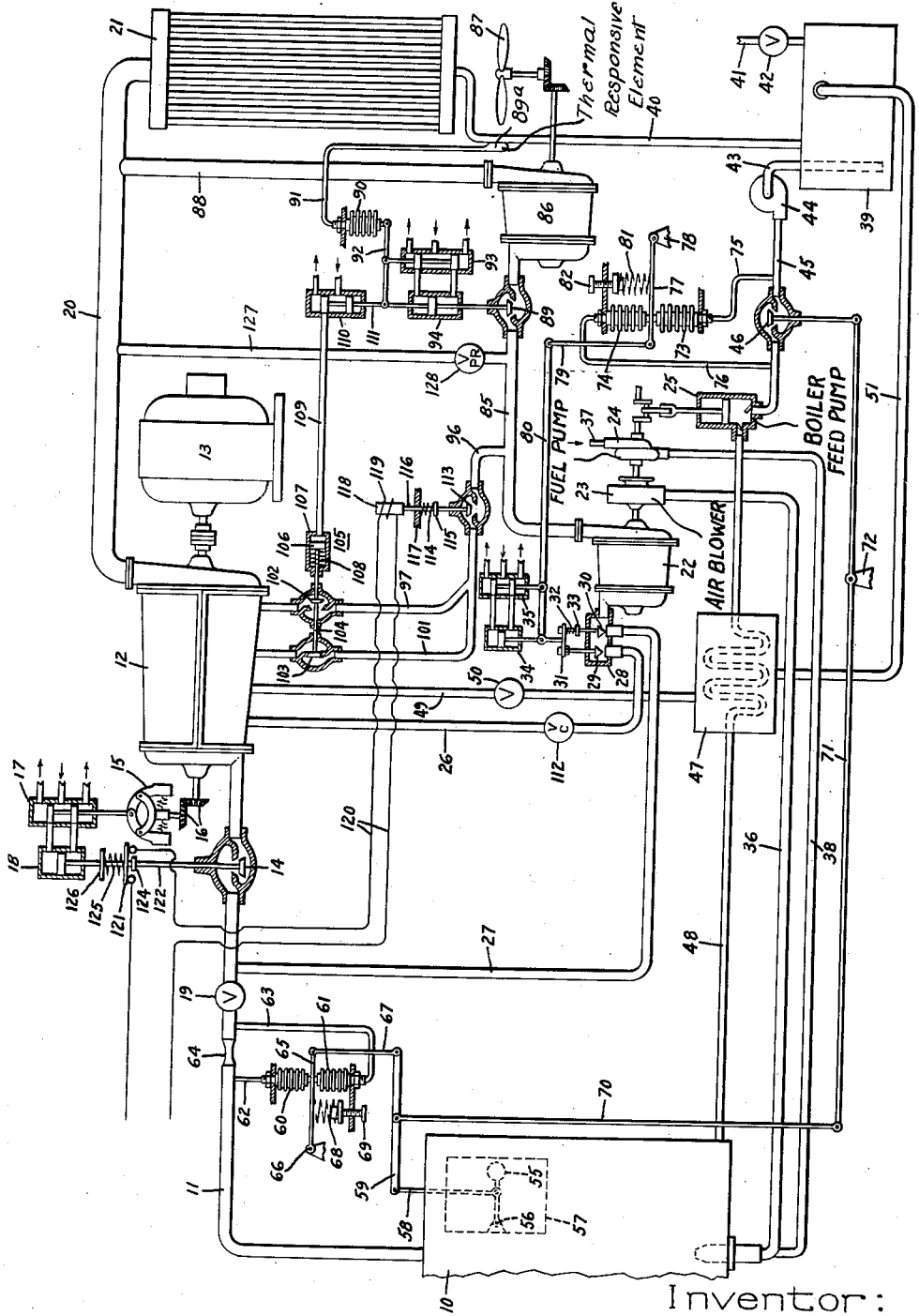

2,235,541

UNITED STATES PATENT OFFICE 2,235,541

TURBINE POWER PLANT ARRANGEMENT

Glenn B. Warren, Niskayuna, N. Y., assignor to General Electric Company, a corporation of New York Application July 1, 1938, Serial No. 216,941

17 Claims. (Cl. 60—96)

The present invention relates to elastic fluid power plants and although not necessarily limited thereto, it is particularly adaptable for use in locomotive vehicles.

The power plant includes an elastic fluid generator comprising a boiler in which liquid is heated and evaporated and a furnace for heating the boiler and means for supplying and controlling the supply of feed liquid to the boiler and combustibles to the furnace. The power plant also includes a main elastic fluid turbine for furnishing motive power, a first auxiliary turbine for driving the boiler and furnace pumps and draft apparatus and a second auxiliary turbine for driving the blowers supplying cooling air to the elastic fluid condensing apparatus.

It is an object of the invention to provide an improved arrangement whereby the main turbine for driving the locomotive and the turbines driving the principal auxiliaries may be operated in the most economical and efficient manner.

It is a further object of the invention to provide an improved arrangement whereby the control and regulation of the various apparatus is accomplished in a simple manner.

For a consideration of what I believe to be novel and my invention, attention is directed to the following description and the claims appended thereto taken in connection with the accompanying drawing.

The single figure of the drawing represents a power plant arrangement embodying my invention. To make clear the arrangement and the functioning thereof, the various pieces of apparatus are shown in diagrammatic form omitting, where possible, elements non-essential to an understanding of the invention and as may be supplied by one skilled in the art.

In the drawing, 10 is an elastic fluid generator comprising a combination boiler and furnace and although any suitable type may be used, one of the forced flow type is preferable. Such a vapor generator is particularly suitable for use in locomotive power plants where load variations are of a wide range and are required to be met substantially instantaneously. Elastic fluid from the boiler is supplied through conduit 11 to the main turbine 12 provided for supplying motive power for the vehicle as through the electric current generator 13. The admission of the elastic fluid to the main turbine may be regulated by an admission valve 14 diagrammatically represented as a globe valve, it being understood, however, that any suitable admission valve is represented thereby. For maintaining a constant speed of the turbine throughout varying load conditions, a governor 15, driven through gearing 16 is arranged for adjusting the admission valve through any suitable means represented diagrammatically by a pilot valve 17 and a hydraulic operating motor 18 arranged in a well-known manner. A valve 19 is provided in the main conduit 11 ahead of the admission valve 14 for emergency control of the fluid flow to the power plant. The exhaust of the main turbine is discharged through the conduit 20 to a suitable heat exchanger or condenser 21 of the air cooled type.

The power plant also includes a first auxiliary turbine 22 arranged for driving the various vapor generator auxiliaries such as the combustion air blower 23, the furnace fuel pump 24 and the boiler feed liquid pump 25. Although these devices are represented as being driven by the same shaft and at the same speed, it will be understood that the necessary gear reduction or driving connections may be supplied between the several devices which would be properly designed as to relative speed, power, etc., and that I merely intend to indicate that the auxiliary turbine 22 drives the devices 23, 24 and 25 simultaneously and in unison. The auxiliary turbine 22 is connected for receiving operating fluid either from a relatively high pressure extraction stage of the main turbine through conduit 26 or from the boiler through a conduit 27 which is in communication with the main conduit 11 ahead of the main turbine admission valve 14. The supply conduits 26 and 27 communicate with the chest 28 of the auxiliary turbine in which are provided the valves 29 and 30 for controlling the admission of elastic fluid from the supply conduits respectively to the turbine. The admission valves 29 and 30 are so connected together and arranged that valve 29 will be opened first upon actuation by the control apparatus and after it has been moved to its wide open position, valve 30 will then be opened. Diagrammatically, I have shown the stem of valve 29 rigidly secured to a cross member 31 while the stem of valve 30 is loosely secured thereto and biased downwardly by a spring 32 arranged between a collar 33 provided on the stem and the cross member 31. The valves may be actuated as by a suitably arranged hydraulic motor 34 regulated through a pilot valve 35 in a well-known manner by a control arrangement to be later described.

The combination air blower 23 supplies air to the furnace of the elastic fluid generator through a suitable conduit 36 extending therebetween. The fuel pump 24 connected to a fuel storage reservoir through conduit 37 supplies fuel to the furnace burner through conduit 38, while the boiler feed pump 25 supplies liquid to the boiler from a storage reservoir in the boiler feed liquid system. Boiler feed liquid is stored in the hot-well 39 which is supplied with condensate drained from the condenser 21 through conduit 40 and additional make-up through a conduit 41 from a suitable source of supply, the amount of make-up being regulated by a suitable valve 42. The feed liquid is withdrawn from the hot-well through a conduit 43 by a suitable booster pump 44 and supplied to the high pressure, positive displacement type boiler feed pump 25 through the conduit 45. An adjustable control valve 46 is placed in the conduit 45 ahead of the feed pump 25 by means of which the quantity of liquid supplied to the boiler is regulated. The liquid discharged by the pump 25 is passed through the preheater 47 and by conduit 48 to the boiler. The preheater may be of any suitable type and may be supplied with heating fluid as from an extraction stage of the main turbine 12 through conduit 49, the conduit having a suitable regulating valve 50 positioned therein. The condensate from the preheater may be passed through the drain conduit 51 to the hot-well 39.

The control valve 46 in the boiler feed liquid conduit 45 is adjusted in accordance with a differential indication of the quantity of liquid present in the boiler and the rate of flow of elastic fluid therefrom. The quantity of liquid present in the boiler is measured by any suitable means such as by a float 55 pivotally mounted as at 56 within a separator drum 57 of the boiler, the liquid level in which is to be maintained constant during normal operation of the boiler. The indication of the liquid level may be transmitted by means of a stem 58 operatively connecting the float 55 to one end of a floating lever 59. The other end of the floating lever is adapted to be adjusted in accordance with the vapor flow from the boiler through the main conduit 11. Any suitable flow responsive actuating arrangement may be used such as a pair of pressure responsive devices 60 and 61 communicating as by connections 62 and 63 with the conduit 11 before and after a fixed orifice 64. The pressure responsive devices 61 and 62 are arranged for differential actuation of an operating lever 65 stationarily pivoted at one end 66, the other end of the lever 65 being connected by a link 67 to the floating lever 59. Adjustment of the flow-indicating arrangement may be accomplished by means of a spring 68 acting upon the operating lever 65, which spring is adjustable by means of the thumb screw 69. A differential indication of the liquid level in the separator drum and of the elastic fluid demand is obtained from a midpoint of the floating lever 59 which indication is transmitted to the boiler feed liquid control valve 46 through the link 70 and the lever 71 which is pivoted to a stationary part 72.

The setting or opening of the feed liquid control valve is adjusted in accordance with the boiler demand indication. It is preferable to adjust the speed or output of the boiler feed pump in response to changes in the control valve setting so that the supply of liquid to the boiler will be in substantial proportion to the demand. This is accomplished by so regulating the elastic fluid admission valves of the auxiliary turbine 22, and hence the speed thereof to maintain substantially constant the pressure drop across the valve 46. It is understood that by maintaining constant the pressure drop across the control valve 46, the rate of flow of liquid therethrough will be substantially proportional to the valve opening. Any suitable apparatus may be used for transmitting indications of the variations in the pressure drop across the valve 46 to the auxiliary turbine admission valves. The diagrammatic arrangement shown comprises a pair of pressure responsive devices 73 and 74 which are in communication by connections 75 and 76 with the feed liquid conduit 45 before and after the valve 46, respectively. The pressure responsive devices are opposingly arranged with respect to an intermediate operating lever 77, pivoted as at 78, which will be actuated in accordance with the differential of pressures or in accordance with the pressure drop variations occurring across the valve 46. Movements of the lever 77 may be transmitted through a link 79 to a floating lever 80 which in turn effects the adjustment of the auxiliary turbine admission valves through means of the pilot valve 35 and the hydraulic operating motor 34. The arrangement is such that the auxiliary turbine admission valves will be moved to a slightly more opened position in response to a decrease in pressure drop occurring across the control valve 46, or to a slightly more closed position in the event of an increase in pressure drop occurring across the valve 46. The pressure responsive devices may be adjusted for a normal position at any predetermined constant pressure drop accoss the valve 46 by means of the biasing spring 81 acting upon the lever 77, which spring is adjustable by means of the thumb screw 82.

The operation of the arrangement thus far described is as follows: Assume, first, that the main turbine 12 is operating under a normal constant load condition and that the speed of the auxiliary turbine 22 and, hence, the output of the boiler feed pump 25, is adjusted so as to maintain a constant pressure drop across the valve 46 for supplying boiler feed liquid at the demand rate. During this condition prevailing, the speed of the auxiliary turbine is maintained by the adjustment of the admission valve 29 controlling the flow of elastic fluid from the main turbine extraction stage. Admission valve 30 is retained in its closed position by the biasing spring 32 during this condition obtaining. Assume now that the load condition on the main turbine is decreased, or for any other reason, that the output of the feed liquid pump 25 is slightly greater than that demanded by the vapor generator causing the liquid in the separator drum 57 to rise above the normal level. Float 55 will rise accordingly, the motion of which is transmitted through the link 58, the floating lever 59, the link 70, and the pivoted lever 71 to move the valve 46 to a slightly more closed position. This adjustment of the valve 46 will cause a corresponding drop in pressure after it, which drop will effect a collapsing movement of the pressure responsive device 74 and a resultant clockwise rotation of the pivoted lever 77. The motion of the lever 77 will be transmitted through the link 79 and the lever 80 which pivots counter-clockwise about its left end to move the valve heads of the pilot valve 35 upwardly. In a well-known manner operating fluid will be supplied to the hydraulic motor 35 to move the admission valve 29 to a slightly more closed position simultaneously pivoting the lever 80 in a counter-clockwise direction about its right end to close the pilot valve ports. The supply of elastic fluid to the auxiliary turbine will be reduced, and accordingly its speed as well as the output of the boiler feed pump 25 will drop, until the pressure after the valve 46 is built up and the predetermined pressure drop across the valve is reestablished. A drop occurring for any reason in the liquid level in the boiler separator drum 57 will cause an operation of the control apparatus in a manner reverse to that described to effect a proportionate increase in the speed of the auxiliary turbine and output of the feed pump 25. In a similar manner, variations in vapor flow through the fixed orifice 64, due to variations in load on the main turbine 12, will be accompanied by corresponding variations in speed of the auxiliary turbine 22. It will be noted that each variation in speed of the auxiliary turbine 22 also results in corresponding variations in the supply of combustibles to the furnace of the vapor generator. Auxiliary apparatus for further regulating the supply of combustibles to the furnace, taking into consideration such additional factors as the vapor pressure existing in the boiler, are known and may be added to supplement the controls described. Such regulating apparatus, however, forms no part of this invention and consideration of the functions of such apparatus is not essential to an understanding of the present invention.

The power requirements for driving the vapor generator auxiliaries are usually not such as necessitate a driving turbine of many stages and hence the fluid exhausted therefrom may still possess considerable energy capable of performing an additional amount of work.

According to the present invention the exhaust from the auxiliary turbine 22 is passed through conduit 85 to a second auxiliary turbine 86 which is provided for driving one or more blower fans 87 for circulating cooling air across the heat exchange surfaces of the condenser 21. The second auxiliary turbine may exhaust into the condenser 21 through a conduit 88 communicating with the main turbine exhaust conduit 20. The flow of elastic fluid to the second auxiliary turbine may be regulated by means of a suitable admission valve 89 which admission valve may be adjusted in accordance with an indication of the operating condition of the condenser 21 to vary the speed of the turbine and the circulation of cooling air as required to maintain substantially constant the operation thereof under all conditions of the power plant. Such an indication may be obtained from the condenser pressure or the condenser temperature as measured at a suitable point. In the instant modification I have shown an arrangement for controlling the auxiliary turbine admission valve in response to variations in temperature of the condensate flowing from the condenser 21 through the drain conduit 40 to the hot-well. A bulb 89a containing a fluid is arranged in thermal communication with the conduit 40 and is connected by a pipe 91 with an expansible element, such as a bellows 90. The movement of the expansible element 90 is transmitted through a lever 92 through a usual pilot valve 93 and a hydraulic motor 94 to the stem of the valve 89. By the arrangement shown, an increase in the operating temperature of the condenser 21 will effect the expansion of the element 90 which in turn will rotate the lever 92 in a clockwise direction about its left end. The ports of the pilot valve 43 will be opened to admit operating fluid to the lower portion of the hydraulic motor 94 and move the admission valve 89 to a more opened position. The opening movement of the valve 89 in the well-known manner effects the closing of the ports of the pilot valve 93 by rotating the lever 92 in a clockwise direction about its right end.

Provision is made for maintaining substantially constant the elastic fluid pressure in the conduit 85 extending between the series connected auxiliary turbines 22 and 86 for any given load on the main turbine and setting of its admission valves. It is understood that in order to make possible satisfactory control of the first auxiliary turbine 22 through the manipulation of its admission valves, the back pressure to this turbine must be maintained at a substantially constant predetermined value irrespective of the position of adjustment of the admission valve 89 controlling the flow of elastic fluid to the second auxiliary turbine 86. For this purpose, I provide a connection 96, 97 between the conduit 85 and a relatively low pressure extraction stage of the main turbine, the normal pressure in which stage is substantially equal to the desired operating back pressure for the auxiliary turbine 22. The function of this connection in the operation of the power plant is as follows. Assume that the operating temperature of the condenser 21 is such that the demand for elastic fluid by the second auxiliary turbine 86 is low and that the admission valve 89 is in a relatively closed position of adjustment. The pressure in the conduit 85 accordingly would tend to rise to a value greater than that existing in the extraction stage of the main turbine in communication therewith. Consequently, elastic fluid will flow from the conduit 85 through the conduits 96 and 97 into the main turbine and, hence, the back pressure of the auxiliary turbine 22 will be maintained substantially at the main turbine extraction stage pressure. The main turbine 12 which ordinarily operates as an extraction turbine becomes a mixed pressure turbine as fluid is supplied to an intermediate stage from the first auxiliary turbine 22 through the conduits 85, 96, 97. Now assume that the operating temperature of the condenser 21 rises to such a value that the admission valve 89 of the auxiliary turbine 86 is moved to a relatively wide opened position and that the demand for elastic fluid is such as would tend to reduce the pressure in the conduit 85 below the predetermined constant value. Upon the occurrence of this condition, elastic fluid will flow from the extraction stage of the main turbine through the connections 97 and 96 into the conduit 85 to maintain the pressure therein substantially equal to the extraction stage pressure and, hence, supply the auxiliary turbine 86 with the requisite increased quantity of operating fluid.

Let us assume the occurrence of an abnormal condition in which the temperature of the condenser 21 rises to a still higher value and that the admission valve 89 is moved to a still wider position of adjustment in response to the further increased demand for operating fluid. The demand for operating fluid by the auxiliary turbine 86 might be greater than the quantity obtainable from the extraction stage tapped by connection 97. To provide for this contingent condition a relatively higher pressure extraction stage of the main turbine may be tapped as by connection 101, which may be opened upon the occurrence of the abnormal condition to admit operating fluid into the conduit 85 at a higher pressure sufficient to meet the demand of the auxiliary turbine 86.

The connections 97 and 101 may be controlled by any suitable arrangement of valves such as 102 and 103 in each connection respectively. The valves may be connected together by a common stem 104, the end of which is connected to a suitable operating motor 105. This motor may be of the fluid-operated type comprising a piston 106 provided on the stem 104 slidably arranged in a cylinder 107 and a biasing return spring 108. Operating fluid for the motor may be supplied through the connection 109 and controlled by the pilot valve 110. The heads of the pilot valve may be connected as by stem 111 to the piston of the operating motor 94 for the admission valve 89, so that when the admission valve 89 is moved to a predetermined wide opened position, as the result of an abnormal demand, the port of the connection 109 will be uncovered to admit operating fluid to the motor 105. The piston 106 will be operated against the force of the spring 108 to open the valve 103. Simultaneously with the opening of valve 103, valve 102 will be closed to prevent recirculation of elastic fluid back into the main turbine. Upon the resumption of normal operating conditions of the condenser, the admission valve 89 will begin to close somewhat, whereupon the pilot valve 110 will be actuated so as to drain the fluid from the motor 105. The spring 108 will return the piston to its normal position, closing valve 103 and reopening valve 102.

In all of the operating conditions above described, it was assumed that the main turbine 12 was operating under a normal loaded condition. However, during no-load conditions, such as may frequently occur in locomotive operation, it may be necessary to continue the operation of the first auxiliary turbine 22 to maintain suitable standby pressure of the vapor generator 10. A sufficient quantity of elastic fluid may not then be available from the main turbine through the extraction conduit 26 for meeting the demand of the auxiliary turbine 22 with the valve 29 in its wide open position. The control arrangement is so adjusted that when at any time the supply of operating fluid available through the extraction conduit 26 is insufficient for maintaining the constant pressure drop across the control valve 46, the valve 30 is opened to admit fluid directly from the boiler through conduit 27. Valve 30 will then be regulated in a manner similar to that previously described with regard to valve 29. Reversal of flow through the conduit 26 from the valve chest 28 to the main turbine may be prevented by a check valve 112.

During the condition last assumed, that is, with the auxiliary turbine 22 receiving operating fluid through conduit 27 and with the main turbine idling or at a stand still, it will be undesirable to permit elastic fluid to pass from the conduit 85 into the low pressure stages of the main turbine. To prevent such flow of fluid vapor, a valve 113 is provided in the conduit 96 between the conduit 85 and the extraction connections, which valve will be operated to its closed position upon a predetermined adjustment of the admission valve 14 controlling the flow of elastic fluid to the main turbine. Although any suitable arrangement may be provided for effecting such control, I have shown a diagrammatic arrangement in which the valve 113 is normally biased to a closed position by means of a spring 114 arranged between a collar 115 provided on the valve stem 116 and a stationary part 117. For operating this valve to the open position, the stem 116 is connected with an armature 118 arranged within a solenoid 119. The energization of the solenoid circuit 120 is controlled by a contactor operatively associated with the main turbine admission valve mechanism. As indicated, the contactor comprises a movable contact element 121 loosely mounted upon a stem 122 of valve 14. The element 121 is biased towards contacts in the circuit 120 by means of a spring 125 arranged between the element 121 and a stop 126 provided on the stem 122. The contactor is so arranged that the solenoid circuit will be completed and valve 113 maintained open during predetermined loaded conditions of operation of the main turbine 12 when it is permissible for operating fluid to be supplied to the low pressure stages thereof. During idling, no load, or stand still conditions of the main turbine when the admission valve 14 is adjusted to a predetermined closed position the solenoid circuit will be deenergized since the stop 124 will engage with the contact element 121 to break the circuit. Valve 113 will then be actuated to its closed position by means of the biasing spring 114.

During the no load condition of operation of the main turbine, it is obvious that the greatly reduced quantity of spent vapor exhausted into the condenser will cause its operating temperature to drop rapidly. Accordingly, the demand for elastic fluid by the second auxiliary turbine 86 will also fall off to a correspondingly low value as its admission valves will be moved toward the closed position. Provision must be made for by-passing the exhaust from the auxiliary turbine 22 to permit the operation thereof. As shown, a by-pass connection 127 is provided between the conduit 85 and the main turbine exhaust conduit 20 which in turn communicates with the condenser 21. The by-pass conduit 127 is provided with a pressure relief valve 128, of a suitable type, which will be actuated to an opened position upon a predetermined increase in pressure in the conduit 85 above the normal operating back pressure of the auxiliary turbine 22.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a power plant, the combination of a boiler, a main turbine connected to said boiler, a first auxiliary turbine connected to said boiler, a second auxiliary turbine operable independently of said first auxiliary turbine, a connection for supplying elastic fluid from said first auxiliary turbine to said second auxiliary turbine, and a conduit extending from an intermediate stage of said main turbine to the connection between said auxiliary turbines whereby the pressure in said connection is maintained substantially at the pressure prevailing in said intermediate stage.

2. In a power plant, the combination of a boiler, a main turbine connected to said boiler, a first auxiliary turbine connected to said boiler, a second auxiliary turbine connected for receiving operating fluid from said first auxiliary turbine, conduit means extending from the connection between said first and second auxiliary turbines to a plurality of intermediate stages of said main turbine, and valve means for selectively controlling the passage of operating fluid between one of said plurality of stages and said connection between said auxiliary turbines.

3. In a power plant, the combination of a boiler, a main turbine connected to said boiler, a first auxiliary turbine connected to said boiler, a second auxiliary turbine connected for receiving operating fluid from said first auxiliary turbine, conduit means extending from the connection between said first and second auxiliary turbines to a plurality of intermediate stages of said main turbine, valve means for selectively controlling the passage of operating fluid between one of said plurality of stages and said connection between said auxiliary turbines, and means for controlling said valve means in accordance with the demand for elastic fluid by said second auxiliary turbine.

4. An elastic fluid power plant comprising a main turbine, a first auxiliary turbine connected for receiving operating fluid from a first intermediate stage of said main turbine, a second auxiliary turbine operable independently of said first auxiliary turbine and connected for receiving operating fluid discharged from said first auxiliary turbine, and means including a conduit extending from a second intermediate stage of said main turbine to the second auxiliary turbine for maintaining the elastic fluid pressure to said second auxiliary turbine substantially equal to the pressure obtaining in said second intermediate stage.

5. An elastic fluid power plant comprising a main turbine, a first auxiliary turbine connected for receiving operating fluid from a first intermediate stage of said main turbine, a second auxiliary turbine operable independently of said first auxiliary turbine, a connection for supplying elastic fluid from said first auxiliary turbine to said second auxiliary turbine, means including a conduit extending from a second intermediate stage of said main turbine to the connection between said auxiliary turbine whereby the pressure in said connection is maintained at a pressure substantially equal to the pressure prevailing in said second intermediate stage, valve means arranged in said conduit, and means for automatically closing the valve means in response to a predetermined low load condition of operation of said main turbine.

6. In a power plant, the combination of a boiler, a main turbine connected to the boiler, means for regulating the supply of elastic fluid to the main turbine, an auxiliary turbine connected to the boiler, a connection for conducting elastic fluid from a first intermediate stage of said main turbine to said auxiliary turbine, a connection for conducting the exhaust fluid from said auxiliary turbine to a second intermediate stage of said main turbine, automatically operable valve means in said connections to said first and second intermediate stages for precluding flow of elastic fluid into said intermediate stages during predetermined conditions of operation of said main turbine.

7. In a power plant having a boiler, a main turbine connected to said boiler, a first auxiliary turbine connected for receiving elastic fluid from a first intermediate stage of said main turbine and also connected to said boiler for receiving operating fluid therefrom during a predetermined condition of operation of said main turbine and other elastic fluid consuming apparatus connected for receiving operating fluid from said first auxiliary turbine, the combination comprising conduit means extending from the connection between said first auxiliary turbine and said after-connected apparatus to a plurality of relatively low pressure intermediate stages of said main turbine, valve means for selectively controlling the passage of operating fluid between one of said plurality of low pressure stages and said connection between said auxiliary turbine and said elastic fluid consuming apparatus, means for controlling said valve means in accordance with the demand for elastic fluid by said apparatus, and automatic means for precluding flow of elastic fluid into said main turbine from said auxiliary turbine during predetermined conditions of operation of said main turbine.

8. In a power plant, the combination of a boiler, a main turbine connected to said boiler, a first auxiliary turbine connected to a first intermediate stage of said main turbine and connected to said boiler, a second auxiliary turbine connected for receiving exhaust fluid from said first auxiliary turbine, an extraction conduit extending from a second intermediate stage of said main turbine to said connection between said auxiliary turbines for maintaining substantially second intermediate stage pressure in said connection, a valve in said extraction conduit, means for effecting the closure of said valve upon a predetermined condition of operation of said main turbine and means for by-passing elastic fluid around said second auxiliary turbine upon a predetermined increase in pressure above said second intermediate stage pressure obtaining in said connection.

9. In a power plant having a boiler, a main turbine connected to said boiler, a first auxiliary turbine connected to a first intermediate stage of said main turbine and to said boiler, and other steam consuming apparatus connected for receiving the exhaust fluid from said first auxiliary turbine, the combination including an extraction conduit extending from the second intermediate stage of said main turbine to said connection between said auxiliary turbine and said steam consuming apparatus for normally maintaining substantially second intermediate stage pressure in said connection, a valve in said extraction conduit automatically operable to the closed position upon a predetermined condition of operation of said main turbine, and means for by-passing elastic fluid around said elastic fluid consuming apparatus responsive to a predetermined increase in pressure above said second intermediate stage pressure obtaining in said connection.

10. In a power plant, the combination of a boiler, boiler auxiliaries, a main turbine connected to said boiler, a condenser for receiving the exhaust of said main turbine, a first auxiliary turbine connected to said boiler for driving said auxiliaries, cooling means for said condenser, a second auxiliary turbine for driving said cooling means, a connection for conducting the exhaust from said first auxiliary turbine to said second auxiliary turbine, an extraction conduit extending from an intermediate stage of said main turbine to said connection between said auxiliary turbines, valve means in said extraction conduit operable to a closed position upon a predetermined condition of operation of said main turbine, conduit means by-passing said second auxiliary turbine, and valve means in said by-pass conduit automatically opened upon a predetermined pressure existing in said connection between said auxiliary turbines.

11. In a power plant, the combination of a boiler, boiler auxiliaries, a main turbine connected to said boiler, a condenser for receiving the exhaust of said main turbine, a first auxiliary turbine connected to a first intermediate stage of said main turbine and to said boiler for driving said boiler auxiliaries, cooling means for said condenser, a second auxiliary turbine for driving said cooling means, a connection for conducting the exhaust from said first auxiliary turbine to said second auxiliary turbine, an extraction conduit communicating with a second intermediate stage of said main turbine and the connection between said auxiliary turbines for maintaining substantially second intermediate stage pressure in said connection, and admission valves for said second auxiliary turbine automatically adjustable in accordance with a condition of operation of said condenser.

12. In a power plant, the combination of a boiler, boiler auxiliaries, a main turbine connected to said boiler, a condenser for receiving the exhaust of said main turbine, a first auxiliary turbine connected to a first intermediate stage of said main turbine and to said boiler for driving said boiler auxiliaries, cooling means for said condenser, a second auxiliary turbine for driving said cooling means, a connection for conducting the exhaust from said first auxiliary turbine to said second auxiliary turbine, an extraction conduit communicating with a second intermediate stage of said main turbine and the connection between said auxiliary turbines for maintaining substantially second intermediate stage pressure in said connection, valve means in said extraction conduit operable to a closed position upon a predetermined condition of operation of said main turbine, admission valves for said second auxiliary turbine automatically adjustable in accordance with a condition of operation of said condenser, conduit means for by-passing the exhaust from said first auxiliary turbine around said second auxiliary turbine to said condenser, and a valve in said last-mentioned conduit means operable to the opened position upon a predetermined pressure obtaining between said auxiliary turbines.

13. In an elastic fluid power plant the combination of a main turbine, a condenser connected thereto, a first auxiliary turbine, means for supplying operating fluid to said main and to said first auxiliary turbine, a second auxiliary turbine, a connection for conducting operating fluid from said first auxiliary turbine to said second auxiliary turbine, a conduit including valve means for discharging operating fluid from said connection to a lower stage of the main turbine, and means for moving said valve means in response to temperature changes of condensate discharged from the condenser.

14. An elastic fluid power plant comprising a main turbine, a first auxiliary turbine connected for receiving operating fluid from a first intermediate stage of said main turbine, admission valves for said first auxiliary turbine, power plant auxiliary apparatus driven by said first auxiliary turbine, means responsive to load demand by said apparatus for regulating said admission valves, a second auxiliary turbine connected for receiving operating fluid from said first auxiliary turbine, an admission valve for said second auxiliary turbine, means responsive to the load demand of said second auxiliary turbine for regulating said admission valve thereof, and means for diverting the operating fluid from said first auxiliary turbine when said admission valve of said second auxiliary turbine is in a predetermined closed position.

15. The combination of a main turbine, a first turbine and a second turbine mechanically independent of each other and of the main turbine, a first conduit connecting the first and the second turbine in series, and a pressure-equalizing conduit between the first conduit and an intermediate stage of the main turbine.

16. The combination of a main turbine, a first turbine, a second turbine, a conduit connecting the first and the second turbines in series, and other conduit means including valves for alternately connecting the first conduit to higher and lower intermediate stages of the main turbine.

17. The combination of a main turbine, a first turbine, an elastic fluid consumer, a first conduit connecting the consumer to the exhaust end of the first turbine, means including a valve in the first conduit for controlling the flow of fluid to the consumer, another conduit connected to an intermediate stage of the main turbine and to the first conduit ahead of the valve, and means including a valve in the other conduit and a device for operating the valve upon a predetermined load condition on the main turbine.

GLENN B. WARREN.